United States Patent
Mufti et al.

(10) Patent No.: US 11,082,458 B2
(45) Date of Patent: Aug. 3, 2021

(54) WEB ACCESS IN 5G ENVIRONMENTS

(71) Applicant: T-Mobile USA, Inc., Bellevue, WA (US)

(72) Inventors: Shujaur Mufti, Snoqualmie, WA (US); Christopher H. Joul, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 308 days.

(21) Appl. No.: 16/102,512

(22) Filed: Aug. 13, 2018

(65) Prior Publication Data
US 2019/0058741 A1 Feb. 21, 2019

Related U.S. Application Data

(60) Provisional application No. 62/547,499, filed on Aug. 18, 2017.

(51) Int. Cl.
*H04L 29/06* (2006.01)
*H04L 29/08* (2006.01)

(52) U.S. Cl.
CPC ........ *H04L 65/1073* (2013.01); *H04L 65/102* (2013.01); *H04L 65/1006* (2013.01); *H04L 65/1016* (2013.01); *H04L 67/02* (2013.01)

(58) Field of Classification Search
CPC . H04L 65/102; H04L 65/608; H04L 65/1006; H04L 65/1016; H04L 65/1073; H04L 67/02; H04L 67/141; H04W 8/02
See application file for complete search history.

(56) References Cited

U.S. PATENT DOCUMENTS

2011/0287743 A1 11/2011 Hu et al.
2015/0280963 A1* 10/2015 Bollapalli ............. H04W 48/00
709/227

(Continued)

FOREIGN PATENT DOCUMENTS

WO WO2015093058 A1 6/2015

OTHER PUBLICATIONS

3GPP TS 23.501 V1.2.0, '3GPP; TSG SA; System Architecture for the 5G System; Stage 2 (Release 15)', Copyright 2017, Jul. 2017, 167 pages.

(Continued)

*Primary Examiner* — Nicholas R Taylor
*Assistant Examiner* — Michael Li
(74) *Attorney, Agent, or Firm* — Lee & Hayes, P.C.

(57) ABSTRACT

Techniques for web access in a 5G wireless networking environment are discussed herein. In particular, techniques can be implemented in $5^{th}$ Generation (5G) environments via a web access component configured to accept HTTP requests or WebSocket requests from a user equipment and initialize a session in various components in the 5G environment to utilize a user plane function. In some instances, the web access can be provided by a web access interworking function (WxIWF) interface in communication with an access and mobility management function (AMF) and a user plane function (UPF). In some instances, this arrangement facilitates seamless transitions between non-3GPP access and 3GPP access because traffic associated with both types utilize a same session in the 5G environment components.

16 Claims, 9 Drawing Sheets

(56) References Cited

U.S. PATENT DOCUMENTS

| | | |
|---|---|---|
| 2016/0219083 A1* | 7/2016 | Gangadharan ........ H04L 67/145 |
| 2017/0150420 A1 | 5/2017 | Olsson et al. |
| 2018/0006998 A1* | 1/2018 | Chatterjee ........... H04L 65/1073 |
| 2018/0192337 A1* | 7/2018 | Ryu ................... H04W 36/0066 |
| 2018/0376384 A1* | 12/2018 | Youn ....................... H04W 8/02 |

OTHER PUBLICATIONS

3GPP TS 33.203 V14.1.0, "3GPP; TSG SA; 3G security; Access security for IP-based services (Release 14)", Copyright 2017, Jun. 2017, 146 pages.

GPP TS 23.502 V0.6.0, '3GPP; TSG SA; Procedures for the 5G System; Stage 2 (Release 15)', Copyright Aug. 2017, 149 pages.

PCT Search Report and Written Opinion dated Nov. 28, 2018 for PCT Application No. PCT/US2018/046605, 10 pages.

Alcatel-Lucent, et al., "WebRTC joint architecture proposal", 3GPP Draft, vol. SA WG2, Nov. 15, 2013, Retrieved from URL <<http://www.3gpp.org/ftp/tsg sa/WG2_Arch/TSGS2 100 San Francisco/Docs/>>; 8 pgs.

Extended European Search Report dated Feb. 18, 2021 for European Patent Application No. 18846761.7, 10 pages.

T-Mobile Inc., "New IMS WebRTC Interworking Solution (Procedures)", 3GPP Draft, vol. SA WG2, Nov. 12, 2013, Retrieved from URL <<URL:http://www.3gpp.org/ftp/Meetings 3GPPSYNC/SA/SA2/Docs/>>; 12 pgs.

* cited by examiner

WEB ACCESS IN 5G ENVIRONMENTS

CROSS REFERENCE TO RELATED APPLICATIONS

This patent application claims priority filing benefit from U.S. Provisional Patent Application No. 62/547,499, filed Aug. 18, 2017, which is hereby incorporated by reference, in its entirety.

BACKGROUND

Modern terrestrial telecommunication systems include heterogeneous mixtures of second, third, and fourth generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. Moving forward, future telecommunications systems may include fifth generation (5G) cellular-wireless access technologies to provide improved bandwidth and decreased response times to a multitude of devices that may be connected to a network.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

The systems, devices, and techniques described herein are directed to web access in fifth generation (5G) environments. In particular, the systems, devices, and techniques can be implemented in 5G environments via a web access component configured to accept HTTP requests from a user equipment and initiate a session in various components in the 5G environment to utilize a user plane function. In some instances, the web access can be provided by a web access inter-working function (WxIWF) interface in communication with an access and mobility management function (AMF) and a user plane function (UPF). In some instances, this arrangement facilitates seamless transitions between non-3GPP access (e.g., via a Wi-Fi base station) and 3GPP access (e.g., via a 5G New Radio) because traffic associated with both types utilize a same session in the 5G environment components.

Some implementations of 5G environments may facilitate web access (e.g., HTTP requests) via a WebRTC Gateway which can receive HTTP requests and convert such requests into session initiation protocol (SIP) messages. In such implementations, the WebRTC Gateway can provide traffic directly into an IP Multimedia Subsystem (IMS) network. In some instances, the systems, devices, and techniques described herein are directed to a WxIWF interface that converts HTTP requests into 3GPP accesses to utilize the functions of the 5G environment components. In some instances, the systems, devices, and techniques described herein are directed to a webserver gateway (WS GW) that converts HTTP requests from the 5G environment into SIP messages to communicate using the IMS network.

The systems, devices, and techniques described herein can improve a functioning of a network by utilizing a common session for both 3GPP and non-3GPP traffic. In some instances, the architecture can provide seamless transitions between various types of traffic in a network. Further, the architecture can provide a consistent Quality of Service (QoS) without regard to the source of traffic in the network. Additionally, incorporating the components discussed herein into the 5G environments improves scalability as a number of users and components are added and removed from the network. These and other improvements to the functioning of a computer and network are discussed herein.

Figure 1:
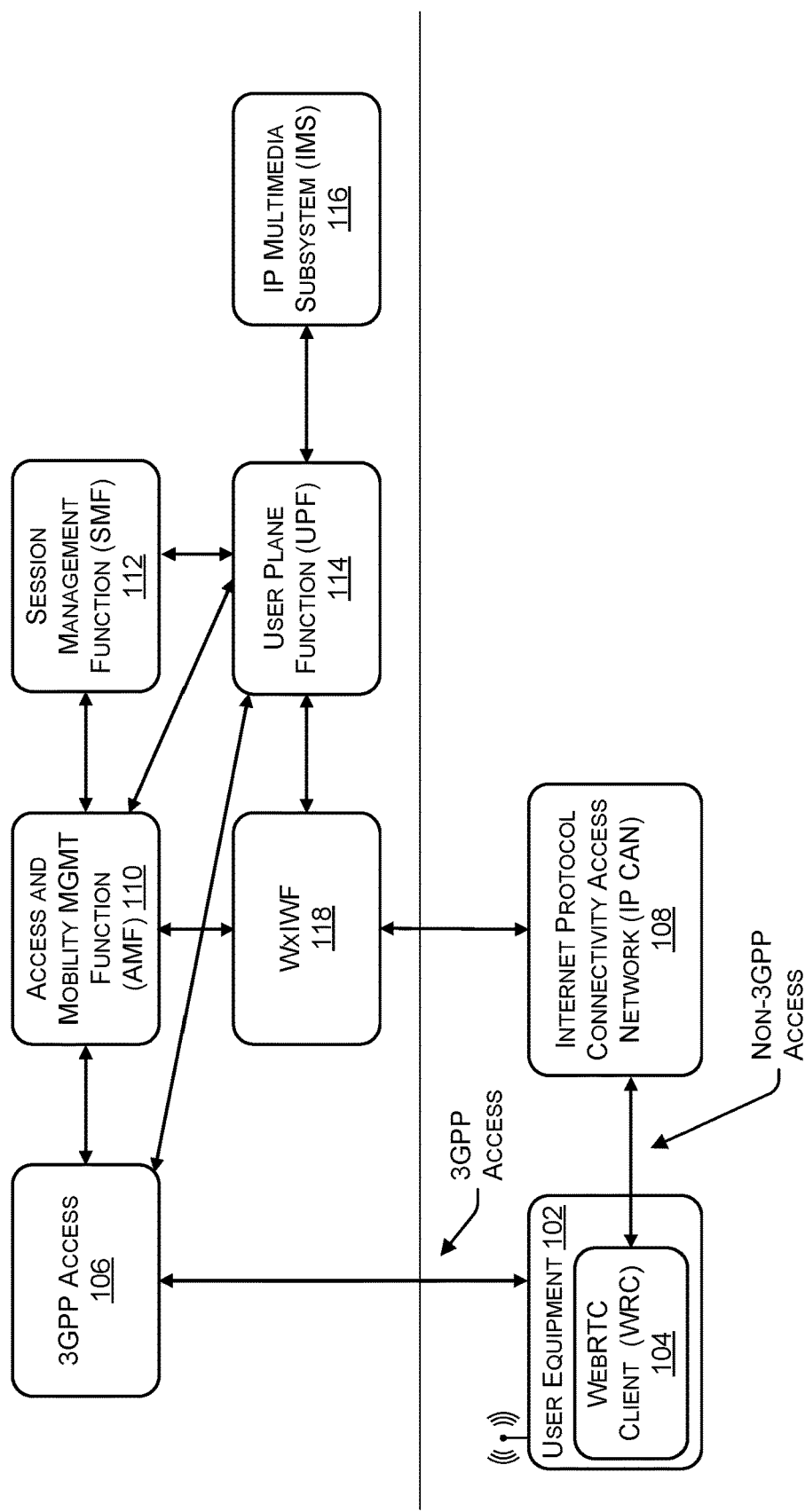
FIG. 1 illustrates a first example environment including a user equipment (UE) and various components implementing the web access in 5G environments, as described herein.

FIG. 1 illustrates an example environment 100 including user equipment and various components implementing the web access in 5G environments, as described herein.

As illustrated, the environment 100 includes a user equipment 102 including a WebRTC client 104 (e.g., a web real-time communications client). In some instances, the WebRTC client 104 is an application operating on the user equipment (UE) 102 to communicate with another user device. In some instances, the WebRTC client 104 (also referred to as WRC 104) can be downloaded to the UE 102 by a user. In some instances, the WRC 104 can be a browser-based application that can be instantiated in any web browser.

The environment 100 further includes a 3GPP access component 106 which can receive 3GPP communications, such as in accordance with GSM/EDGE RAN (GERAN), a Universal Terrestrial RAN (UTRAN), an evolved UTRAN (E-UTRAN), or other various protocols. In some instances, the 3GPP access component 106 can comprise a 5G New Radio (NR) or a gNodeB base station.

In some instances, non-3GPP communications such as via Wi-Fi or a wired LAN can be provided through an internet protocol connectivity access network (IP CAN) 108. In some instances, the IP CAN 108 can comprise a Wi-Fi base station (and may also be referred to as a Wi-Fi access point).

Further, the environment 100 can include an access and mobility management function (AMF) 110, a session management function (SMF) 112, a user plane function (UPF) 114, and an IP multimedia subsystem (IMS) 116.

The environment 100 can further include a web access inter-working function (WxIWF) 118 configured to receive communications from the IP CAN 108, to initiate a session via the AMF 110, and to provide network traffic via the UPF 114. Further, the WxIWF 118 can represent a WebRTC Gateway node that is in direct communication with the various nodes of the 5G environment to provide full access to the web traffic. Accordingly, the WxIWF 118 can provide non-3GPP sessions anchored in 5G, thereby enabling similar QoS (Quality of Service) and CoS (Class of Service) for the 5G user (e.g., the UE 102).

The various functions and components discussed herein can be implemented either as a network element on a dedicated hardware, as a software instance running on a dedicated hardware, or as a virtualized function instantiated on an appropriate platform, such as a cloud infrastructure.

In general, the UE 102 can be implemented as any suitable type of computing device configured to communicate over a wired or wireless network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), an internet-of-things (IoT) device, an in-vehicle (e.g., in-car) computer, and/or any similar mobile device, as well as situated computing devices including, without limitation, a television (smart television), set-top-box (STB), desktop computer, an IoT device, and the like.

In general, the AMF 110 can be implemented as a network function including functionality to provide UE-based authentication, authorization, mobility management, etc., to various UEs. In some instances, the AMF 110 can include functionality to terminate a radio access network (RAN) control plane interface between the UE 102 and other functions on the network. In some instances, the AMF 110 can include functionality to perform registration management of the UE 102 in a network, connection management, reachability management, mobility management, access authentication, access authorization, security anchor functionality (e.g., receiving and/or transmitting security keys during registration/authorization), and the like.

In general, the SMF 112 can be implemented as a network function including functionality to manage communication sessions by and between UEs, and/or to provide internet protocol (IP) addresses to the UEs. In some instances, the SMF 112 can select a UPF of a plurality of UPFs to facilitate communications for the UE 102.

In general, the UPF 114 can be implemented as a network function including functionality to control data transfer between the UE 102 and the various components of the network. In some instances, the UPF 114 can include functionality to act as an anchor point for radio access technology (RAT) handover (e.g., inter and intra), external protocol data unit (PDU) session point of interconnect to a data network (e.g., the internet), packet routing and forwarding, packet inspection and user plane portion of policy rule enforcement, traffic usage reporting, traffic routing, QoS handling for user plane (e.g., packet filtering, gating, uplink/downlink rate enforcement), uplink traffic verification, transport level packet marking in the uplink and downlink, downlink packet buffering and downlink data notification triggering, and the like. As can be understood in the context of this disclosure, there may be a plurality of UPFs associated with a network and/or with the UE 102.

In accordance with various embodiments described herein, the terms "user equipment (UE)," "wireless communication device," "wireless device," "communication device," "mobile device," and "client device," can be used interchangeably herein to describe any UE (e.g., the UE 102) that is capable of transmitting/receiving data wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), $3^{rd}$ Generation (3G) radio access technology, $4^{th}$ Generation (4G) radio access technology, $5^{th}$ Generation (5G) radio access technology, Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), VoLTE, Institute of Electrical and Electronics Engineers' (IEEE) 802.1x protocols, WiMAX, Wi-Fi, Data Over Cable Service Interface Specification (DOCSIS), digital subscriber line (DSL), and/or any future IP-based network technology or evolution of an existing IP-based network technology.

In general, a user can further utilize the UE 102 to communicate with other users and associated UEs via the IP Multimedia Subsystem (IMS) 116 core (sometimes referred to as the "IMS core network," the "IMS network," the "Core Network (CN)," or the "IM CN Subsystem"). IMS is an architectural framework defined by the $3^{rd}$ Generation Partnership Project (3GPP) for delivering Internet Protocol (IP) multimedia to a UE, such as the UE 102. The IMS core can be maintained and/or operated by one or more service providers, such as one or more wireless carriers ("carriers"), that provide IMS-based services to users who are associated with UEs, such as the UE 102. For example, a service provider can offer multimedia telephony services that allow a user to call or message other users via the IMS core using his/her UE. A user can also utilize an associated UE to receive, provide, or otherwise interact with various different IMS-based services by accessing the IMS core. It is to be appreciated that any number of base stations and/or IMS nodes can be include in the IMS network.

Accordingly, an operator of the IMS core can offer any type of IMS-based service, such as, telephony services, emergency services (e.g., E911), gaming services, instant messaging services, presence services, video conferencing services, social networking and sharing services, location-based services, push-to-talk services, and so on. In order to access these services (e.g., telephony services), a UE is configured to request establishment of a communication session. In the case of telephony services, the communication session can comprise a call (e.g., a voice-based communication session, such as a VoLTE call, or a Wi-Fi call).

The UE 102 is configured to utilize various radio access networks (RANs) in order to access the IMS core. In general, the IMS core is agnostic to the access technology that is used to connect a UE to the IMS core. In this manner, the UE 102 can connect to the IMS core via a 3GPP RAN, such a GSM/EDGE RAN (GERAN), a Universal Terrestrial RAN (UTRAN), or an evolved UTRAN (E-UTRAN), an eNodeB, a gNodeB, or alternatively, via a "non-3GPP" RAN, such as a Wi-Fi RAN, or another type of wireless local area network (WLAN) that is based on the IEEE 802.11 standards. Accessing the IMS core through a Wi-Fi access network typically involves the UE 102 communicating with the IMS core through a Wi-Fi access point (AP). Providing access to the IMS core through non-3GPP RANs has opened the door to recent advancements in IMS-based services, such as the introduction of Wi-Fi calling, which allows users to initiate and receive calls over an available Wi-Fi AP. Environments can include any number and type of base stations representing any number and type of macrocells, microcells, picocells, or femtocells, for example, with any type or amount of overlapping coverage or mutually exclusive coverage.

Additional details of the environment 100 are discussed in the call flows illustrated in FIGS. 3-8, as well as throughout this disclosure.

Figure 2:
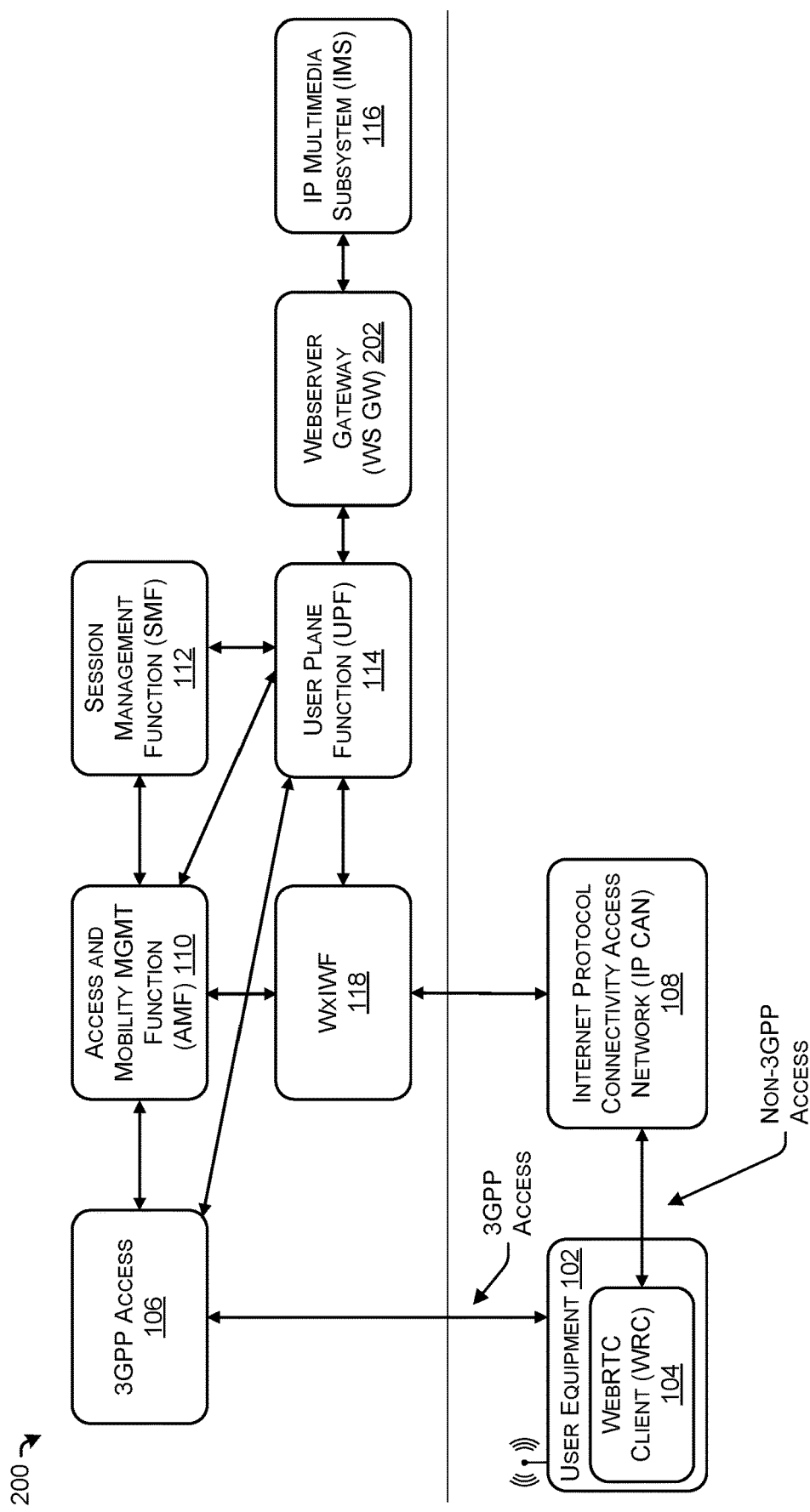
FIG. 2 illustrates a second example environment including a UE and various components implementing the web access in 5G environments, as described herein.

FIG. 2 illustrates a second example environment 200 including a UE and various components implementing the web access in 5G environments, as described herein. In some instances, the environment 200 can substantially correspond to the environment 100 illustrated in FIG. 1, with the addition of a Webserver Gateway (WS GW) 202. In some examples, the WS GW 202 can include functionality to receive HTTP requests and/or WebSocket requests from the WebRTC Client (WRC) 104 and to convert the requests to SIP messages. Further, the WS GW 202 can receive SIP messages from the IMS 116 and can convert the SIP messages to HTTP messages and/or WebSocket messages for the WRC 104.

Additional details of the environment 200 are discussed in the call flows illustrated in FIGS. 3-8, as well as throughout this disclosure.

Figure 3:
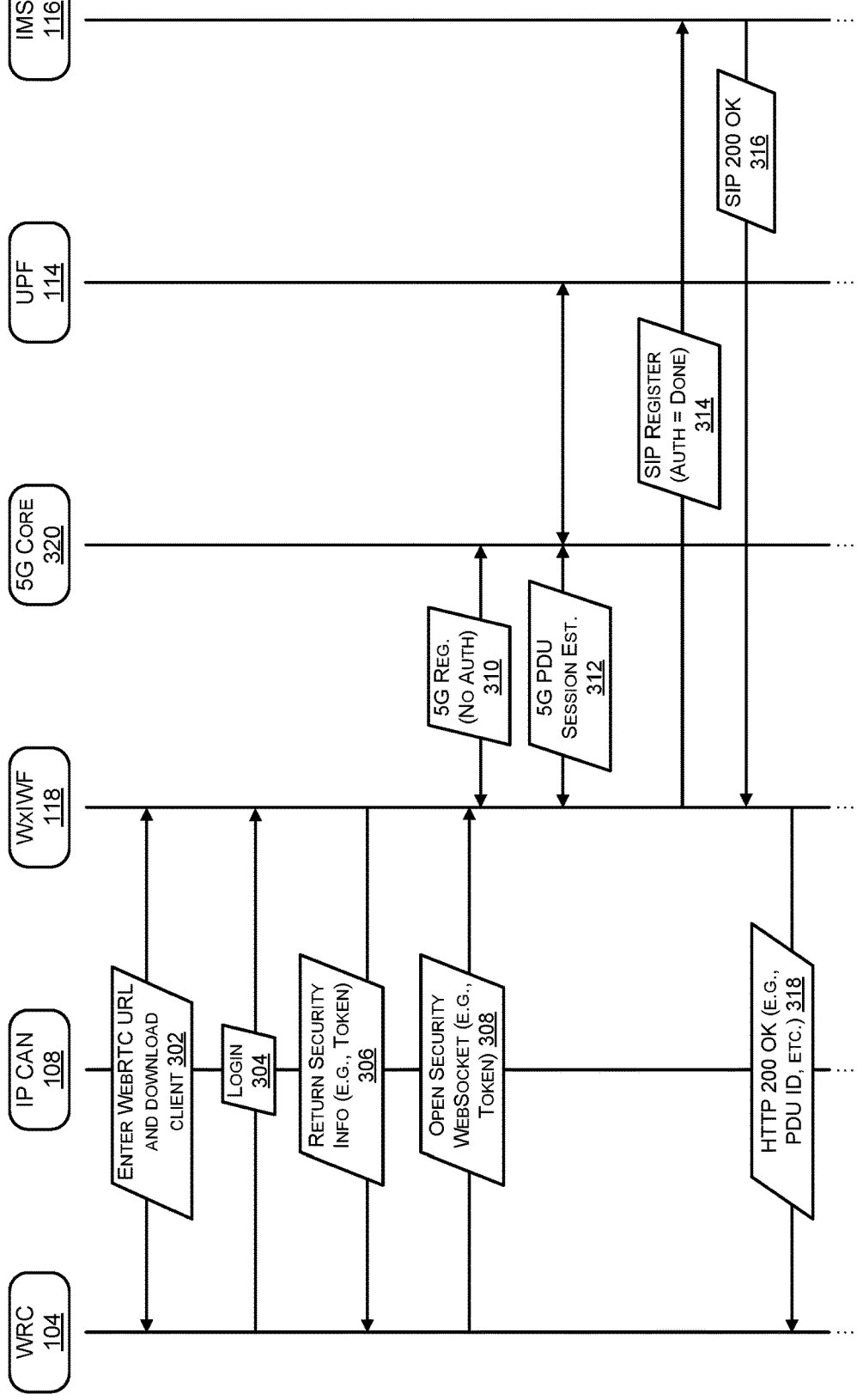
FIG. 3 is a diagram illustrating example registration signaling between a UE and various components of a mobile network corresponding to the first example environment, as described herein.

FIG. 3 is a diagram 300 illustrating example registration signaling between a UE and various components of a mobile network corresponding to the first example environment, as described herein. As can be understood, signals are illustrated by and between various components, with relative timing indicated by a vertical location of signals in the diagram.

In some instances, operations represented in the diagram 300 can be performed by one or more of the WebRTC Client (WRC) 104, the IP Connectivity Access Network (IP CAN) 108, the web access inter-working function (WxIWF) 118, a 5G Core 320 (which may include various components to register a UE in a 5G network, such as one or more of the AMF 110, the SMF 112, or the UDM 914 (discussed below), for example), the user plane function (UPF) 114, and the IP Multimedia Subsystem (IMS) 116.

The WRC 104 can enter a WebRTC uniform resource locator (URL) and may download a client to facilitate the web access in an 5G environment, as discussed herein. In some instances, the WRC 104 can communicate with the WxIWF 118 via signaling 302 to download the client as a JavaScript file to the WRC 104. In some instances, the signaling 302 can ensure that the most current version of the JavaScript or client is operating at the WRC 104 (and accordingly, on the UE 102).

Next, the WRC 104 can use signaling 304 to login to the WxIWF 118 by transmitting an operator identifier (e.g., a WebID) and a password to obtain access to the WxIWF 118 communication functionality. In response to the signaling 304 correctly authenticating an identity of a user profile associated with the WRC 104, the WxIWF 118 can send signaling 306 to the WRC 104, which may include returning security information to the WRC 104, such as a token. Using the token included in the signaling 306, the WRC 104 can send signaling 308 to the WxIWF 118 to open a security WebSocket.

In general, the signaling 302, 304, 306, and 308 between the WRC 104 and the WxIWF 118 are communicated via the IP CAN 106 and in accordance with the connections illustrated in FIG. 1.

In response to the signaling 308, the WxIWF 118 can register with the 5G Core 320 utilizing standard 5G registration flow via the signaling 310. In some instances, because the signaling 302, 304, 306, and 308 was used to authenticate the WRC 104, the signaling 310 may not include authentication.

The WxIWF 118 can exchange signaling 312 by and between the 5G Core 320 and the UPF 114 to establish a 5G PDU (protocol data unit) session, which establishes a logical connection between the WxIWF 118 and the UPF 114.

In response to establishing the 5G PDU session, the WxIWF 118 can send signaling 314 to the IMS 116, which may include a SIP REGISTER message, thereby completing the authorization for registering the WRC 104. In response, the IMS 116 can transmit signing 316, which may include a SIP 200 OK message, to the WxIWF 118, which in turn, can send signaling 318 to the WRC 104. In some cases, the signaling 318 can include an HTTP 200 OK message, which may include PDU identification information.

Figure 4:
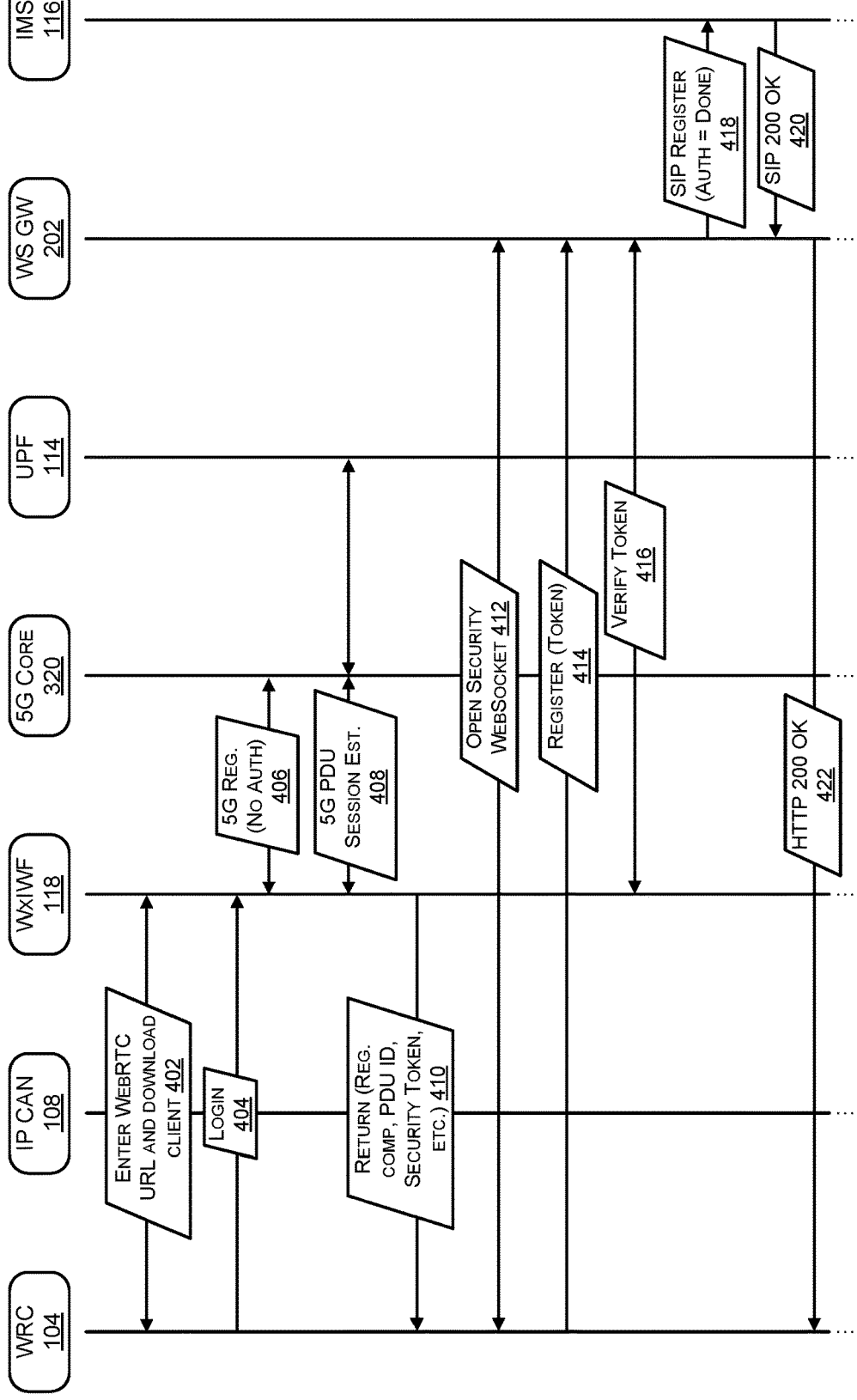
FIG. 4 is a diagram illustrating example registration signaling between a UE and various components of a mobile network corresponding to the second example environment, as described herein.

FIG. 4 is a diagram 400 illustrating example registration signaling between a UE and various components of a mobile network corresponding to the second example environment, as described herein.

In some instances, operations represented in the diagram 400 can be performed by one or more of the WRC 104, the IP CAN 108, the WxIWF 118, the 5G Core 320, the UPF 114, the Webserver Gateway (WS GW) 202, and the IMS 116.

The WRC 104 can enter a WebRTC uniform resource locator (URL) and may download a client to facilitate the web access in an 5G environment, as discussed herein. In some instances, the WRC 104 can communicate with the WxIWF 118 via signaling 402 to download the JavaScript to the WRC 104. In some instances, the signaling 402 can ensure that the most current version of the JavaScript or client is operating at the WRC 104 (and accordingly, on the UE 102).

Next, the WRC 104 can use signaling 404 to login to the WxIWF 118 by transmitting an operator identifier (e.g., a WebID) and a password to obtain access to the WxIWF 118 communication functionality. In response to the signaling 404, the WxIWF 118 can register with the 5G Core 320 via the signaling 406. In some instances, because the signaling 402 and 404 was used to authenticate the WRC 104, the signaling 406 may not include authentication.

The WxIWF 118 can exchange signaling 408 by and between the 5G Core 320 and the UPF 114 to establish a 5G PDU (protocol data unit) session, which establishes a logical connection between the WxIWF 118 and the UPF 114.

In response to establishing the 5G PDU session, the WxIWF 118 can send signaling 410 to the WRC 104. In some cases, the signaling 410 can return an indication that the registration is complete, can return a PDU identifier, can return a security token, and the like.

In response, the WRC 104 can use the PDU identifier, the security token, and the like to exchange signaling 412 with the WS GW 202, which can open a security WebSocket. Further, the WRC 104 can use signaling 414 to register the token with the WS GW 202. The WxIWF 118 and the WS GW 202 can use signaling 416 to verify the token.

Upon verifying the token, the WS GW 202 can send signaling 418 to the IMS 116, which may include a SIP REGISTER message, thereby completing the authorization for registering the WRC 104. In response, the IMS 116 can transmit signaling 420, which may include a SIP 200 OK message, to the WS GW 202, which in turn, can send signaling 422 to the WRC 104. In some cases, the signaling 422 can include an HTTP 200 OK message.

In some case, the signaling represented in the diagrams 300 or 400 can be initiated in connection with starting a communication session using the WRC 104 on a UE 102. In some cases, additional signaling may be included or omitted, depending on a particular implementation.

Figure 5:
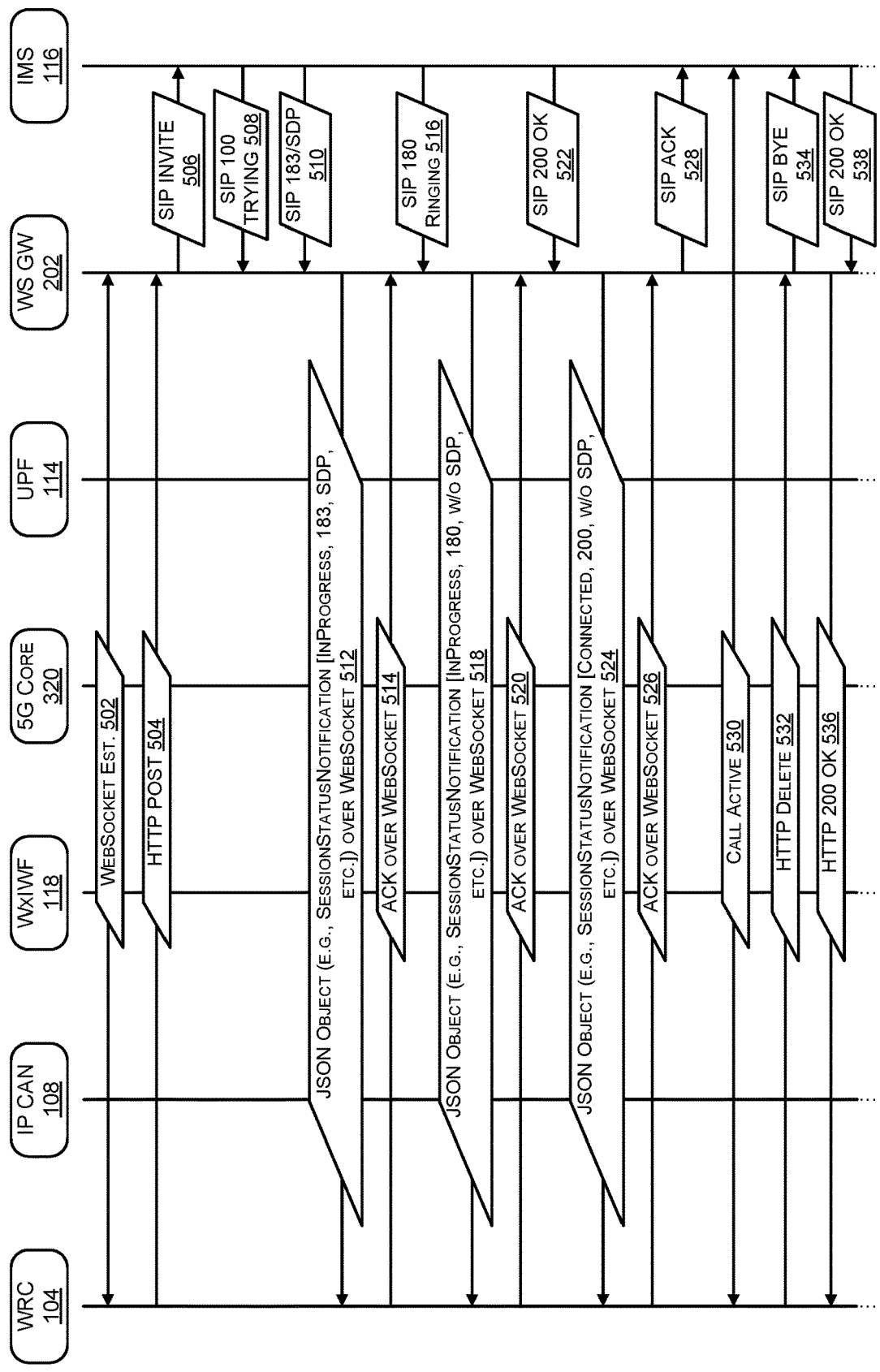
FIG. 5 is a diagram illustrating example signaling to originate a call at a UE in a mobile network corresponding to the second example environment, as described herein.

FIG. 5 is a diagram 500 illustrating example signaling to originate a call at a UE in a mobile network corresponding to the second example environment, as described herein.

In some instances, operations represented in the diagram 400 can be performed by one or more of the WRC 104, the IP CAN 108, the WxIWF 118, the 5G Core 320, the UPF 114, the WS GW 202, and the IMS 116.

The WRC 104 and the WS GW 202 can exchange signaling 502 to initiate a WebSocket between the WRC 104 and the WS GW 202. In some instances, the signaling 502 can include at least a portion of signaling represented in the diagrams 300 or 400. In response to establishing the WebSocket, the WRC 104 can send signaling 504 including an HTTP POST message to the WS GW 202. In response to the signaling 504, the WS GW 202 can send signaling 506 to the IMS 116, which may include a SIP INVITE message.

The IMS 116 can send signaling 508 to the WS GW 202 in response to the signaling 506. In some cases, the signaling 508 can include a SIP 100 TRYING message. Further, the IMS 116 can send signaling 510 to the WS GW 202, which can include a SIP 183/SDP (session description protocol) message.

In response to the signaling 510, the WS GW 202 can send signaling 512 to the WRC 104. In some cases, the signaling 512 can include a JSON object, which may include a SessionStatusNotification[InProgress, 183, with SDP] message over the WebSocket (e.g., established via the signaling 502). The WRC 104 can acknowledge the signaling 512 via signaling 514 to the WS GW 202 that includes an ACK over the WebSocket.

The WS GW 202 can further receive signaling 516 including a SIP 180 RINGING message, and in response, the WS GW 202 can send signaling 518 to the WRC 104, which may include a JSON object including a SessionStatusNotification[InProgress, 180, without SDP] message over the WebSocket. The WRC 104 can acknowledge the signaling 518 via signaling 520 to the WS GW 202 that includes an ACK over the WebSocket.

The WS GW 202 can further receive signaling 522 from the IMS 116 including a SIP 200 OK message, and in response, the WS GW 202 can send signaling 524 to the WRC 104, which may include a JSON object including a SessionStatusNotification[Connected, 200, without SDP] message over the WebSocket. The WRC 104 can acknowledge the signaling 524 via signaling 526 to the WS GW 202 that includes an ACK over the WebSocket. The WS GW 202 can send signaling 528 to the IMS 116, which can complete the call setup. An active call is illustrated as signaling 530.

In some cases, the signaling 530 can represent any type of communication, such as a real-time communication, a video call, SMS/MMS, data sessions, etc.

In some examples, the WRC 104 can terminate the active call signaling 530, illustrated by the signaling 532 sent from the WRC 104 to the WS GW 202. In some instances, the signaling 532 can include an HTTP DELETE message. The WS GW 202 can receive the signaling 532 and can send signaling 534 to the IMS 116, which is illustrated as a SIP BYE message. The WS GW 202 can further send signaling 536 to the WRC 104 indicative of an HTTP 200 OK message.

At least partially in response to receiving the signaling 534, the IMS 116 can send signaling 538 to the WS GW 202 indicative of a SIP 200 OK message.

Figure 6:
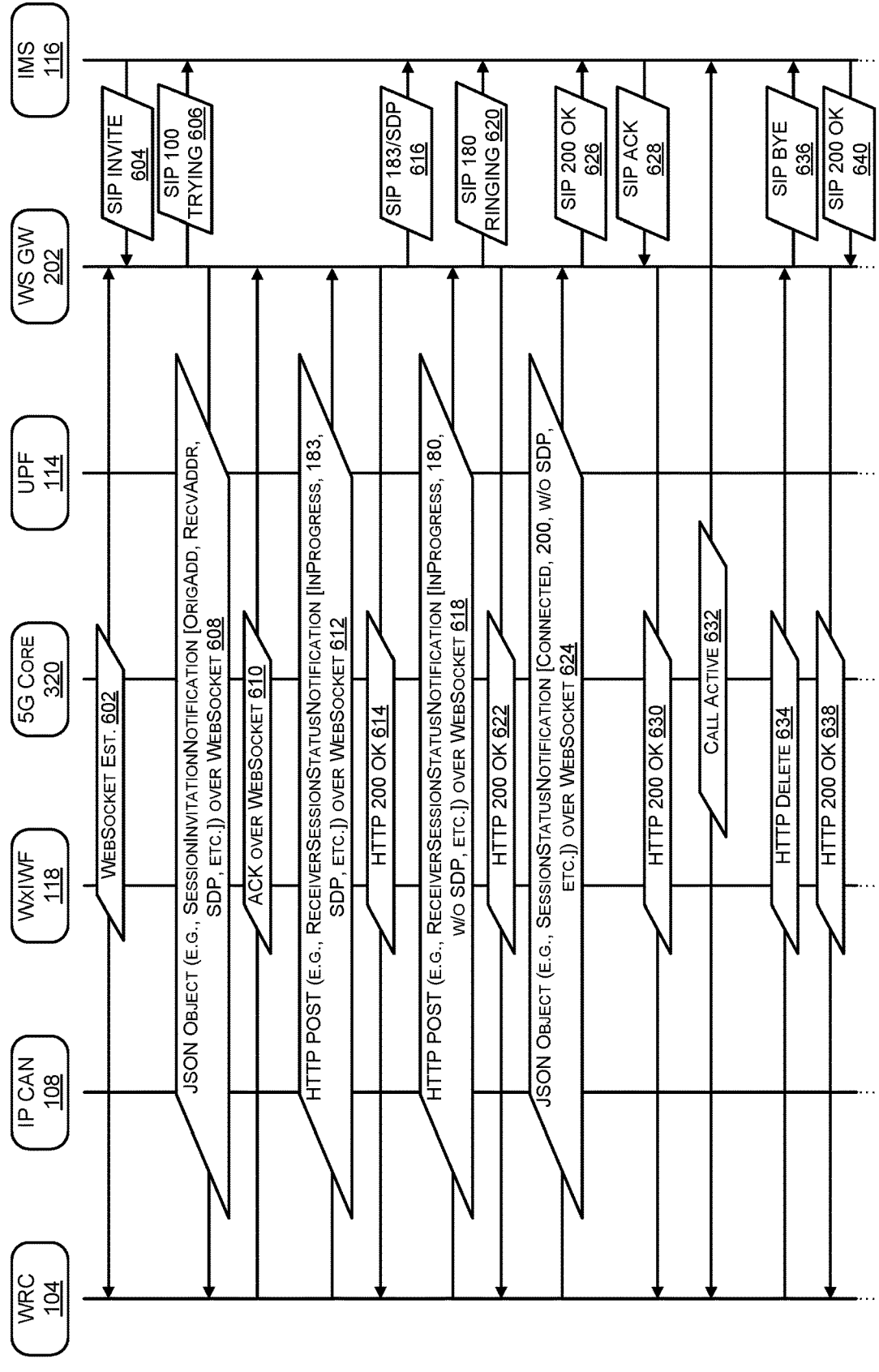
FIG. 6 is a diagram illustrating example signaling to receive a call at a UE in a mobile network corresponding to the second example environment, whereby the call was originated by an external UE, as described herein.

FIG. 6 is a diagram 600 illustrating example signaling to receive a call at a UE in a mobile network corresponding to the second example environment, whereby the call was originated by an external UE, as described herein.

In some instances, operations represented in the diagram 600 can be performed by one or more of the WRC 104, the IP CAN 108, the WxIWF 118, the 5G Core 320, the UPF 114, the WS GW 202, and the IMS 116.

The WRC 104 and the WS GW 202 can exchange signaling 602 to initiate a WebSocket between the WRC 104 and the WS GW 202. In some instances, the signaling 602 can include at least a portion of signaling represented in the diagrams 300 or 400. In response to establishing the WebSocket, the IMS 116 can send signaling 604 to the WS GW 202, which may include a SIP INVITE message. In response to the signaling 604, the WS GW 202 can send signaling 606 to the IMS 116, which can include SIP 100 TRYING message. Further, the WS GW 202 can send signaling 608 to the WRC 104, which may include a JSON object including a SessionInvitationNotification [OrigAdd, RecvAddr, with SDP, etc.] message over the WebSocket. The WRC 104 can acknowledge the signaling 608 using signaling 610.

The WRC 104 can further send signaling 612 to the WS GW 202, which may include HTTP POST messaging including a ReceiverSessionStatusNotification [InProgress, 183, SDP, etc.] message over the WebSocket. The WS GW 202 can acknowledge the signaling 612 using the signaling 614.

Next, the WS GW 202 can send signaling 616 to the IMS 116, which may include a SIP 183 with SDP message.

The WRC 104 may further send signaling 618 to the WS GW 202, which may include an HTTP POST including a ReceiverSessionStatusNotification [InProgress, 180, without SDP, etc.] message over the WebSocket. In response to the signaling 618, the WS GW 202 can send signaling 620 to the IMS 116, which may include a SIP 180 RINGING message. Further, the WS GW 202 can send signaling 622 to the WRC 104, which may include an HTTP 200 OK message.

Next, the WRC 104 can send signaling 624 to the WS GW 202, which may include a JSON object including a SessionStatusNotification [Connected, 200, without SDP, etc.] message over the WebSocket. In response to the signaling 624, the WS GW 202 can send signaling 626 (including a SIP 200 OK message) to the IMS 116, and in response, the IMS 116 can send signaling 628 (including a SIP ACK message) to the WS GW 202.

At least partially in response to the signaling 628, the WS GW 202 can send signaling 630 (including an HTTP 200 OK message) to the WRC 104, thereby establishing an active call, as illustrated by the signaling 632.

In some examples, the WRC 104 can terminate the active call illustrated by the signaling 632, in which case, the WRC 104 can send signaling 634 (including an HTTP DELETE message) to the WS GW 202. At least partially in response to the HTTP DELETE message (in the signaling 634), the WS GW 202 can send signaling 636 (including a SIP BYE message) to the IMS 116 and can send signaling 638 (including an HTTP 200 OK message) to the WRC 104. The WS GW 202 can further receive signaling 640 from the IMS 116 indicative of a SIP 200 OK message.

Figure 7:
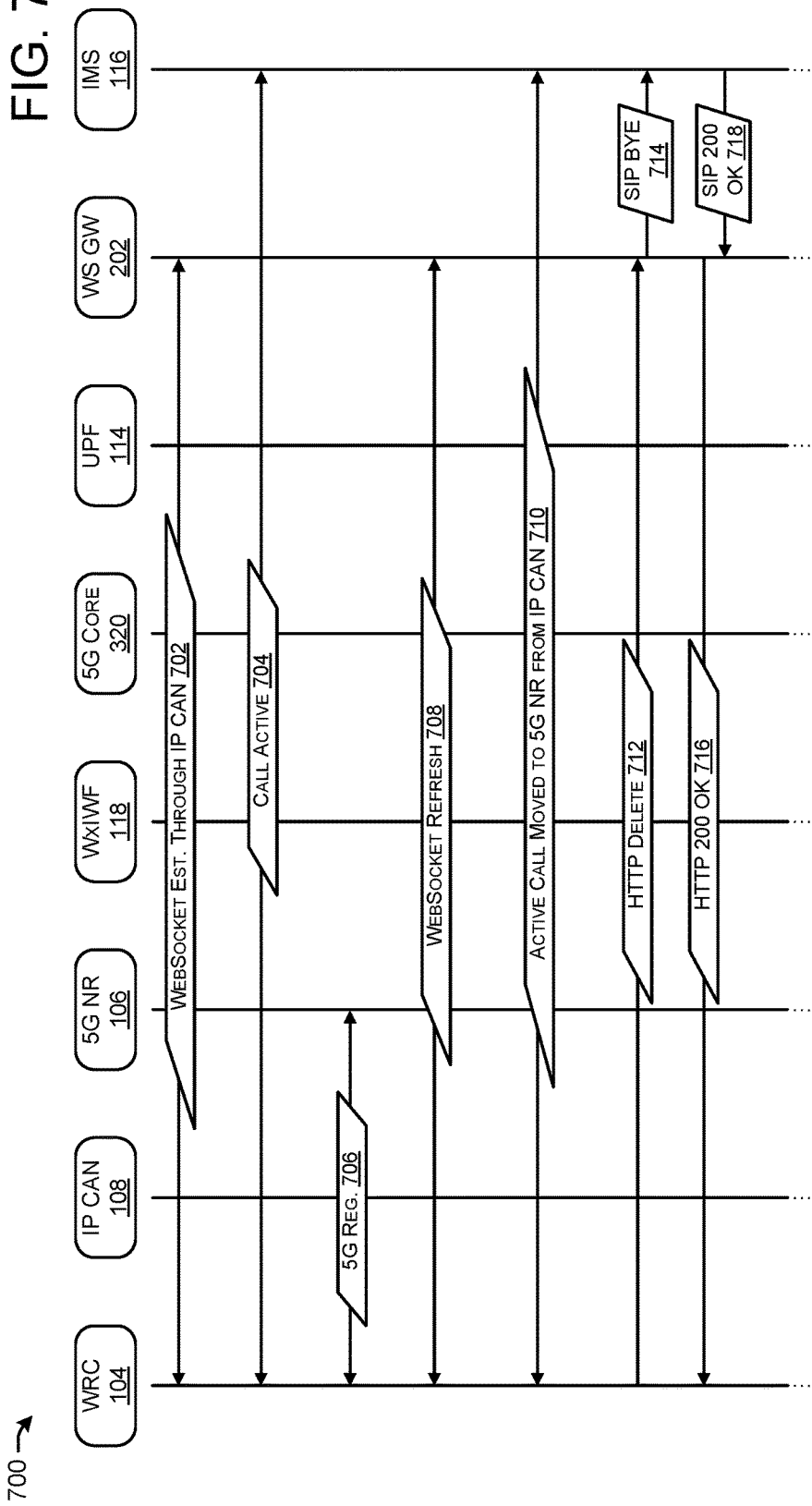
FIG. 7 is a diagram illustrating example signaling to transfer a call from a non-3GPP (3rd Generation Partnership Project) access point to a 3GPP access point in a mobile network corresponding to the second example environment, as described herein.

FIG. 7 is a diagram 700 illustrating example signaling to transfer (handover) a call from a non-3GPP access point to a 3GPP access point in a mobile network corresponding to the second example environment, as described herein.

In some instances, operations represented in the diagram 700 can be performed by one or more of the WRC 104, the IP CAN 108, the 3GPP access 106 (illustrated as a 5G NR 106), the WxIWF 118, the 5G Core 320, the UPF 114, the WS GW 202, and the IMS 116.

The WRC 104 can establish a WebSocket through the IP CAN 108 using the signaling 702. In some instances, the signaling 702 can include aspects of the signaling discussed in the diagrams 300, 400, 500, and 600.

In response to establishing the WebSocket through the IP CAN 108 via the signaling 702, the WRC 104 can use signaling 704 to facilitate an active call, as discussed herein.

In some examples, based on a change in location or signal strength, among other possibilities, the WRC 104 and the 5G NR 106 can exchange signaling 706 to perform 5G registration.

After the WRC 104 (and/or the UE 102) is registered in the 5G network, the WRC 104 and the WS GW 202 can exchange signaling 708 to refresh the WebSocket. In some examples, the signaling 708 can include changing the intermediate IP addresses associated with the WebSocket (e.g., established using the signaling 702) from a first IP address associated with the IP CAN 108 to a second IP address associated with the 5G NR 106.

In response to the signaling 708, the WRC 104 and the IMS 116 can exchange the signaling 710 to move the active call to the 5G NR 106 from the IP CAN 108.

Following a seamless handover from the IP CAN 108 to the 5G NR 106, the WRC 104 can send signaling 712 to the WS GW 202 indicative of an HTTP DELETE message, and in response, the WS GW 202 can send signaling 714 to the IMS 116 indicative of a SIP BYE message. Further, the WS GW 202 can send signaling 716 (e.g., a HTTP 200 OK message) to the WRC 104, and the IMS 116 can send signaling 718 (e.g., a SIP 200 OK message) to the WS GW 202 at least partially in response to the signaling 714.

Figure 8:
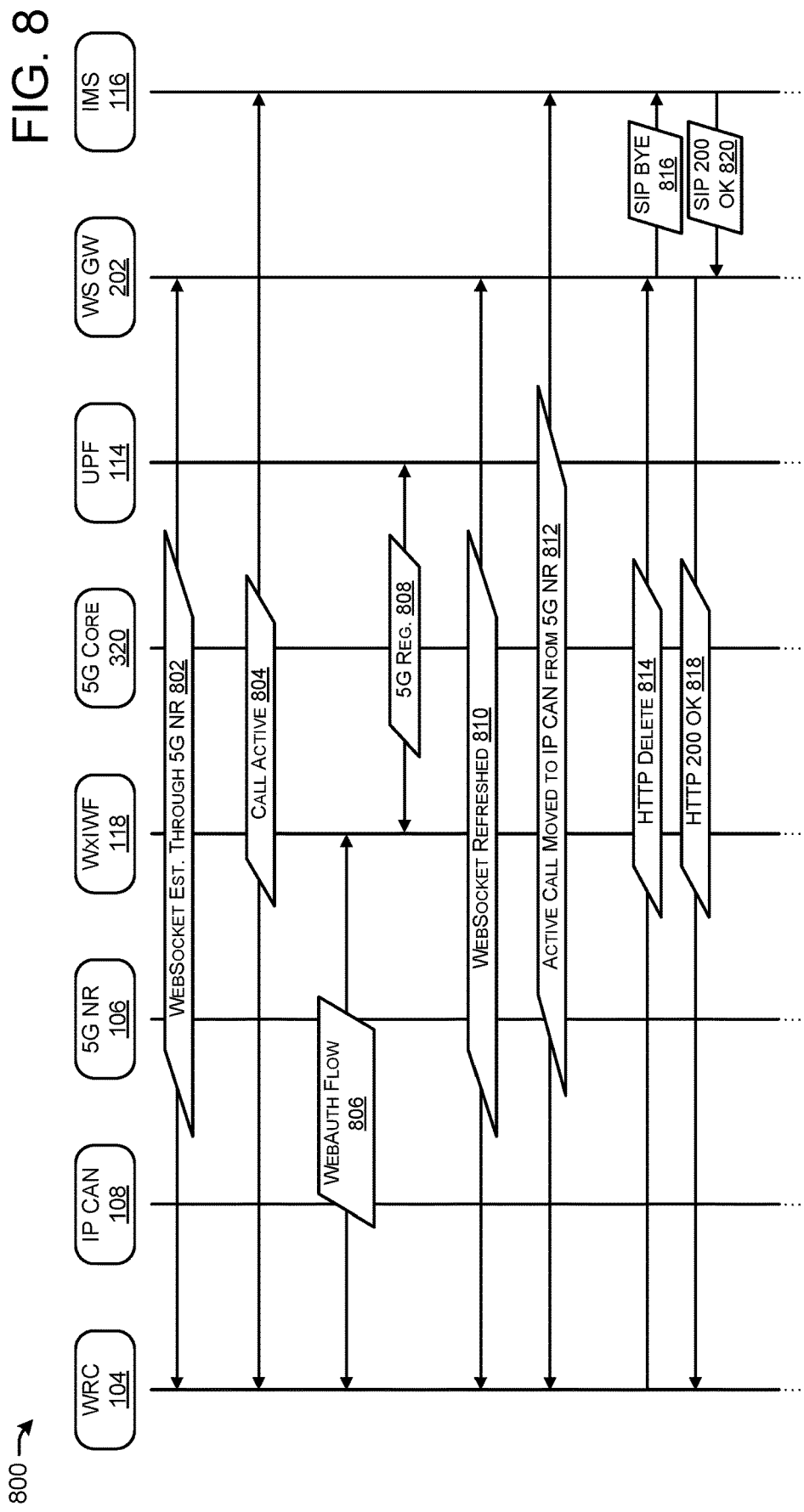
FIG. 8 is a diagram illustrating example signaling to transfer a call from a 3GPP access point to a non-3GPP access point in a mobile network corresponding to the second example environment, as described herein.

FIG. 8 is a diagram 800 illustrating example signaling to transfer (handover) a call from a 3GPP access point to a non-3GPP access point in a mobile network corresponding to the second example environment, as described herein.

In some instances, operations represented in the diagram 800 can be performed by one or more of the WRC 104, the IP CAN 108, the 3GPP access 106 (illustrated as a 5G NR 106), the WxIWF 118, the 5G Core 320, the UPF 114, the WS GW 202, and the IMS 116.

The WRC 104 can establish a WebSocket through the 5G NR 106 using the signaling 802. In some instances, the signaling 802 can include aspects of the signaling discussed in the diagrams 300, 400, 500, and 600.

In response to establishing the WebSocket through the 5G NR 106 via the signaling 802, the WRC 104 can use signaling 804 to facilitate an active call, as discussed herein.

In some examples, based on a change in location or signal strength, among other possibilities, the WRC 104 and the WxIWF 118 can exchange signaling 806, which may include a web authorization flow. In some cases, the signaling 806 may include one or more signals as discussed in the diagrams 300 and 400.

In response to the signaling 806, the WxIWF 118 can exchange signaling 808 with the UPF 114, which may include 5G registration utilizing standard 5G registration flows. At least partially in response to the signaling 808, the WRC 104 and the WS GW 202 can exchange signaling 810 to refresh the WebSocket associated with the active call. In some instances, the signaling 810 can include changing the intermediate IP addresses associated with the WebSocket (e.g., established using the signaling 802) from a first IP address associated with the 5G NR 106 to a second IP address associated with the IP CAN 108.

In response to the signaling 810, the WRC 104 and the IMS 116 can exchange the signaling 812 to move the active call to the IP CAN 108 from the 5G NR 106.

Following the seamless handover from the 5G NR 106 to the IP CAN 108, the WRC 104 can send signaling 814 to the WS GW 202 indicative of an HTTP DELETE message, and in response, the WS GW 202 can send signaling 816 to the IMS 116 indicative of a SIP BYE message. Further, the WS GW 202 can send signaling 818 (e.g., a HTTP 200 OK message) to the WRC 104, and the IMS 116 can send signaling 820 (e.g., a SIP 200 OK message) to the WS GW 202 at least partially in response to the signaling 816.

Figure 9:
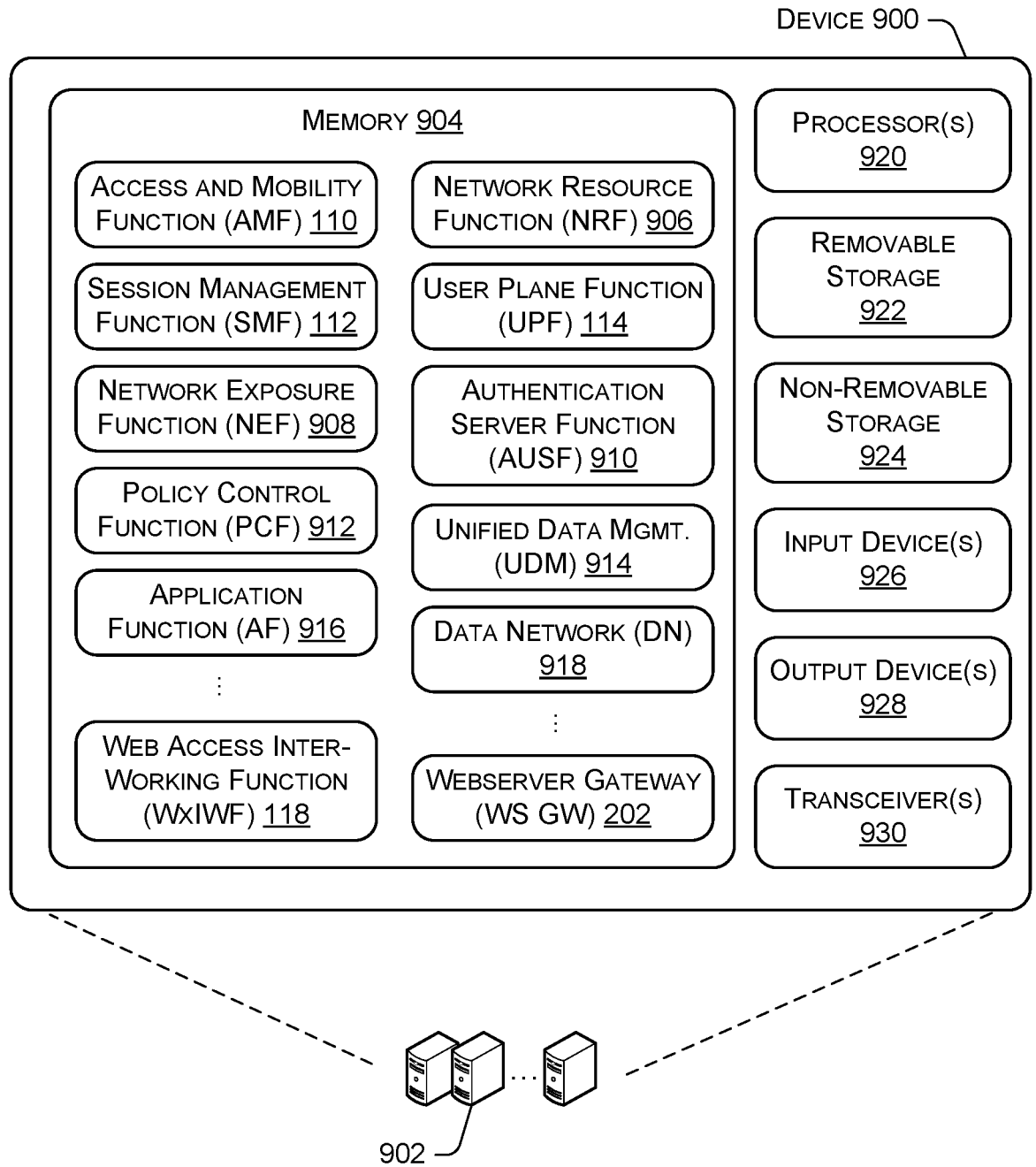
FIG. 9 illustrates an example device configured to implement the web access in 5G environments, as described herein.

FIG. 9 illustrates an example device 900 configured to implement the web access in 5G environments, as described herein. In some embodiments, some or all of the functionality discussed in connection with FIGS. 1-8 can be implemented in the device 900. Further, the device 900 can be implemented as a server computer 902, a network element on a dedicated hardware, as a software instance running on a dedicated hardware, or as a virtualized function instantiated on an appropriate platform, such as a cloud infrastructure, and the like. It is to be understood in the context of this disclosure that the device 900 can be implemented as a single device or as a plurality of devices with components and data distributed among them.

As illustrated, the device 900 may comprise a memory 904 storing the access and mobility management function (AMF) 110, a network resource function (NRF) 906, the session management function (SMF) 112, the user plane function (UPF) 114, a network exposure function (NEF) 908, an authentication server function (AUSF) 910, a policy control function (PCF) 912, a unified data management (UDM) 914, an application function (AF) 916, a data network (DN) 918, the web access inter-working function (WxIWF) 118, and the webserver gateway (WS GW) 202 to provide functionality to the device 900 to facilitate web access in 5G environments, as described herein. Also, the device 900 can include processor(s) 920, a removable storage 922 and non-removable storage 924, input device(s) 926, output device(s) 928, or transceiver(s) 930.

Aspects of the access and mobility management function (AMF) 110, the session management function (SMF) 112, the user plane function (UPF) 114, the web access inter-working function (WxIWF) 118, and the webserver gateway (WS GW) 202 are discussed above in connection with at least FIGS. 1 and 2. In general, these functions comprise aspects of a 5G mobile network.

In general, the NRF 906 can be implemented as a network function including functionality to support service discovery (e.g., receive a network function discovery request and provide information associated with the discovered network function instances to a requesting entity). In some instances, the NRF can receive utilization information, capability information, etc. from various network functions, such as the UPF 114, to provide such utilization information to the other components discussed herein. Further, the NRF 906 can select, assign, implement, or otherwise determine network functions to be used in a network based at least in part on utilization information, as discussed herein.

In general, the NEF 908 can be implemented as a network function including functionality to securely expose services and/or capabilities provided by and amongst the various network functions, as discussed herein. In some instances, the NEF 908 receives information from other network functions and can store the received information as structured data using an interface to a data storage network function.

In general, the AUSF 910 can be implemented as a network function including functionality to provide authentication to various devices in the network. For example, the AUSF 910 can request device credentials (e.g., security key(s)), verify that a device is authorized to connect to a network, and/or control access to the network based on the device credentials.

In general, the PCF 912 can be implemented as a network function including functionality to support unified policy framework to govern network behavior, provide policy rules to control plane functions and/or enforce such rules, and/or implement a front end to access subscription information relevant for policy decisions in a data repository.

In general, the UDM 914 can be implemented as a network function including functionality to process authentication credentials, handle user identification processing, manage registration and/or mobility, manage subscriptions between a UE and a carrier, and or manage SMS (short message service) data.

In general, the AF 916 can be implemented as a network function including functionality to route traffic to/from applications operating on the network, facilitate accessing the network exposure function (NEF) 908, and interact with the policy framework for policy control in connection with the PCF 912.

In general, the DN 918 can include any public or private network(s), such as the internet.

In various embodiments, the memory 904 is volatile (such as RAM), non-volatile (such as ROM, flash memory, etc.) or some combination of the two.

In some embodiments, the processor(s) 920 is a central processing unit (CPU), a graphics processing unit (GPU), or both CPU and GPU, or other processing unit or component known in the art.

The device 900 can also include additional data storage devices (removable and/or non-removable) such as, for example, magnetic disks, optical disks, or tape. Such additional storage is illustrated in FIG. 9 by removable storage 922 and non-removable storage 924. Tangible computer-readable media can include volatile and nonvolatile, removable and non-removable media implemented in any method or technology for storage of information, such as computer readable instructions, data structures, program modules, or other data. Memory 904, removable storage 922 and non-removable storage 924 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the device 900. Any such tangible computer-readable media can be part of the device 900.

The device 900 also can include input device(s) 926, such as a keypad, a cursor control, a touch-sensitive display, voice input device, etc., and output device(s) 928 such as a display, speakers, printers, etc.

As illustrated in FIG. 9, the device 900 also includes one or more wired or wireless transceiver(s) 930. For example, the transceiver(s) 930 can include a network interface card (NIC), a network adapter, a local area network (LAN) adapter, or a physical, virtual, or logical address to connect to the various base stations or networks contemplated herein, for example, or the various user devices and servers. To increase throughput when exchanging wireless data, the transceiver(s) 930 can utilize multiple-input/multiple-output (MIMO) technology. The transceiver(s) 930 can comprise any sort of wireless transceivers capable of engaging in wireless, radio frequency (RF) communication. The transceiver(s) 930 can also include other wireless modems, such as a modem for engaging in Wi-Fi, WiMAX, Bluetooth, or infrared communication.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   one or more processors;
   a memory; and
   one or more components stored in the memory and executable by the one or more processors to perform operations comprising:
   receiving from a WebRTC client of a user equipment (UE), at a web access inter-working function (WxIWF) of a 5th generation (5G) core network, a request to establish a communication between the UE and the 5G core network, wherein the UE is communicatively coupled to a Wi-Fi base station;
   in response to the request, registering the UE in the 5G core network;
   establishing, by a user plane function (UPF), a 5G Protocol Data Unit (PDU) session associated with the UE;
   sending registration information to the UE, the registration information including at least a WebSocket token; and
   establishing a WebSocket between the UE and a web-server gateway (WS GW), the establishing including:
   receiving a token at the WS GW;
   sending the token to the WxIWF; and
   determining that the token corresponds to the WebSocket token sent to the UE,
   wherein the UE and WxIWF are connected to an Internet Protocol Multimedia Subsystem (IMS) associated with the 5G core network through at least one of the UPF or an accessibility and mobility management function (AMF) of the 5G core network, and wherein the WxIWF converts the request for utilization by 5G core network functions and the WS GW converts the request to session initiation protocol (SIP) for the IMS.

2. The system of claim 1, the operations further comprising:
receiving, at the WS GW and from the UE, an HTTP POST message;
at least partially in response to the HTTP POST message, sending, by the WS GW, a SIP INVITE message to the IMS; and
establishing an active communication between the UE and the IMS based at least in part on the WS GW interfacing between the WebSocket and SIP messaging.

3. The system of claim 2, the operations further comprising:
transitioning, as a handover, the active communication from the Wi-Fi base station to a new radio (NR) base station;
wherein the handover includes refreshing an intermediate internet protocol (IP) address of the WebSocket associated with a first IP address associated with the Wi-Fi base station with a second IP address associated with the NR base station.

4. The system of claim 2, the operations further comprising:
establishing the active communication further based at least in part on one or more JSON objects received at the WS GW from the UE via WebSocket.

5. The system of claim 1, wherein the registration information further includes information associated with the 5G PDU session.

6. A method implemented by one or more processors, the method comprising:
receiving from a WebRTC client of a user equipment (UE), at a first network function of a 5th generation (5G) core network, a request to establish a communication between the UE and the 5G core network, wherein the UE is communicatively coupled to a non-3rd Generation Partnership Project (3GPP) base station;
in response to the request, registering the UE in the 5G core network;
establishing, by a user plane function (UPF), a 5G Protocol Data Unit (PDU) session associated with the UE;
sending registration information to the UE, the registration information including at least a WebSocket token; and
establishing a WebSocket between the UE and a second network function, the establishing including:
receiving a token at the second network function;
sending the token to the first network function; and
determining that the token corresponds to the WebSocket token sent to the UE,
wherein the UE and first network function are connected to an Internet Protocol Multimedia Subsystem (IMS) associated with the 5G core network through at least one of the UPF or an accessibility and mobility management function (AMF) of the 5G core network, and
wherein the first networking function is a web access inter-working function (WxIWF) that converts the request for utilization by 5G core network functions and the second network function is a webserver gateway (WS GW) that converts the request to session initiation protocol (SIP) for the IMS.

7. The method of claim 6, further comprising:
receiving, at the first network function and from the UE, an HTTP POST message;
at least partially in response to the HTTP POST message, sending, by the second network function, a SIP INVITE message to the IMS; and
establishing an active communication between the UE and the IMS based at least in part on the second network function interfacing between the WebSocket and SIP messaging.

8. The method of claim 7, further comprising:
establishing the active communication further based at least in part on one or more JSON objects received at the second network function from the UE via the WebSocket.

9. The method of claim 7, further comprising:
transitioning, as a handover, the active communication from the non-3GPP base station to a new radio (NR) base station;
wherein the handover includes refreshing an intermediate internet protocol (IP) address of the WebSocket associated with a first IP address associated with the non-3GPP base station with a second IP address associated with the NR base station.

10. The method of claim 7, wherein the non-3GPP base station is a Wi-Fi base station.

11. The method of claim 6, wherein the registration information further includes information associated with the 5G PDU session.

12. A non-transitory computer-readable medium storing instructions that, when executed, cause one or more processors to perform operations comprising:
receiving from a WebRTC client of a user equipment (UE), at a first network function of a 5th generation (5G) core network, a request to establish a communication between the UE and the 5G core network, wherein the UE is communicatively coupled to a non-3rd Generation Partnership Project (3GPP) base station;
in response to the request, registering the UE in the 5G core network;
establishing, by a user plane function (UPF), a 5G Protocol Data Unit (PDU) session associated with the UE;
sending registration information to the UE, the registration information including at least a WebSocket token; and
establishing a WebSocket between the UE and a second network function, the establishing including:
receiving a token at the second network function;
sending the token to the first network function; and
determining that the token corresponds to the WebSocket token sent to the UE,
wherein the UE and first network function are connected to an Internet Protocol Multimedia Subsystem (IMS) associated with the 5G core network through at least one of the UPF or an accessibility and mobility management function (AMF) of the 5G core network, and
wherein the first networking function is a web access inter-working function (WxIWF) that converts the request for utilization by 5G core network functions and the second network function is a webserver gateway (WS GW) that converts the request to session initiation protocol (SIP) for the IMS.

13. The non-transitory computer-readable medium of claim 12, the operations further comprising:
receiving, at the first network function and from the UE, an HTTP POST message;

at least partially in response to the HTTP POST message, sending, by the second network function, a SIP INVITE message to the IMS; and establishing an active communication between the UE and the IMS based at least in part on the second network function interfacing between the WebSocket and SIP messaging.

14. The non-transitory computer-readable medium of claim 13, the operations further comprising:

transitioning, as a handover, the active communication from the non-3GPP base station to a new radio (NR) base station;

wherein the handover includes refreshing an intermediate internet protocol (IP) address of the WebSocket associated with a first IP address associated with the non-3GPP base station with a second IP address associated with the NR base station.

15. The non-transitory computer-readable medium of claim 13, the operations further comprising:

establishing the active communication further based at least in part on one or more JSON objects received at the second network function from the UE via the WebSocket.

16. The non-transitory computer-readable medium of claim 12, wherein the registration information further includes information associated with the 5G PDU session.

* * * * *